J. P. ROSS.
Grain Drill.
No. 6,743.
Patented Sept. 25, 1849.
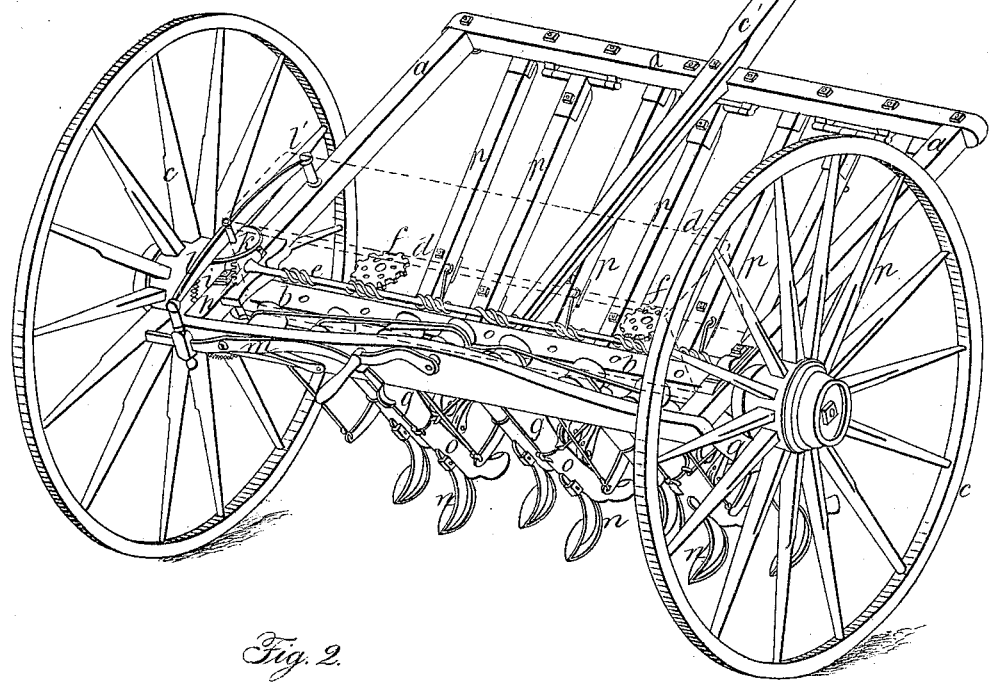
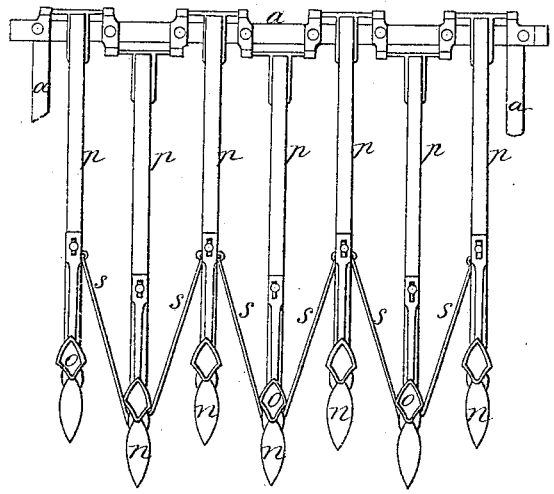
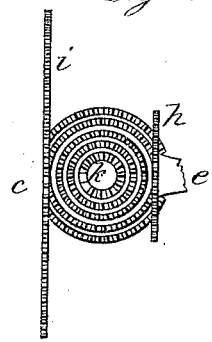

UNITED STATES PATENT OFFICE.

JAMES P. ROSS, OF LEWISBURG, PENNSYLVANIA.

IMPROVEMENT IN SEED-PLANTERS.

Specification forming part of Letters Patent No. 6,743, dated September 25, 1849.

*To all whom it may concern:*

Be it known that I, JAMES P. ROSS, of Lewisburg, in the county of Union and State of Pennsylvania, have invented certain new and useful Improvements in Seeding-Machines; and I do hereby declare that the following is a full, clear, and exact description of the principle or character which distinguishes them from all other things before known, and of the usual manner of making, modifying, and using the same, reference being had to the accompanying drawings, in which—

Figure 1 is an isometrical view. Fig. 2 is a plan of the under side of the beams and teeth: Fig. 3, the gearing detached.

My improvements in the construction of the seed-drill are, first, the mode of regulating the quantity of seed to be dropped; secondly, the apparatus for regulating the depth of the drill; and, lastly, the method of bracing the beams to which the hollow teeth are affixed, so as to keep them steadily in place and allow them freedom of motion to vibrate up and down.

The parts are constructed as follows: There is an oblong frame, $a$, connected with an axle, $b$, and mounted on wheels $c$. To this frame is affixed a pole, $c'$, by which it is drawn. Just over the axle the seeding-box or hopper $d$, of an oblong form, is situated. This is shown in red lines in Fig. 1 so as to show the interior apparatus. It extends nearly from one wheel to the other, and may be divided into separate cells by partitions. Along the bottom of this hopper $d$ a shaft, $e$, runs, bearing upon it the seeding apparatus, which may be either a roller or series of rollers with cells in their periphery, as in many ordinary seed-planters; or a screw may be formed on the shaft, as shown in the drawings, by which the seed is distributed, and when corn is to be dropped spur-wheels $f$ may be placed in two or more of the cells, with holes around their faces, into which the seed drop, and from which they descend through the ordinary elastic tubes, $g$, to the hollow teeth, through which they are deposited in the earth. The shaft $e$ has on its outer end, beyond the box, a spur-wheel, $h$, and on the hub of the wheel $c$ there is another spur-wheel, $i$, opposite to and parallel with that on shaft $e$. Above these two wheels there is a third, $k$, having crown-teeth on its face in several concentric rows, as clearly shown in Fig. 3. This wheel is suspended by its bearing in the center of a horizontal lever, $l$, that has its fulcrum forward at $l'$ on the side of the frame and extends back to behind the hopper, where its rear end is coupled with a transverse lever, $m$, so that it can be moved laterally, by which means any of the concentric rows of teeth can be brought into contact with the two spur-wheels $h$ and $i$, so as to change their relative motion. It is obvious that friction-wheels may be employed instead of the toothed wheels; but they will not work with the same accuracy. The last-named lever, $m$, also rises and falls to throw the wheel $k$ into or out of gear. By the lateral motion of the wheel $k$ the quantity of seed is regulated, and by throwing it out of gear the seeding stops.

To regulate the depth to which the teeth shall run, I affix to the back part of the shaft of each tooth an adjustable gage-piece, $n$, which is curved and convex on its under side. This piece can be set so as to permit the tooth to enter at any given depth within its range, and it smooths the ground and leaves it in a proper state to receive the moisture directly upon the grain by depressing it at that point.

The teeth $o$ are each affixed to a beam, and all the beams $p$ are jointed to the front bar of the frame $a$. They are so set that every other tooth is a little in advance of the next succeeding one, for the purpose of working free and avoid choking between them, and all the beams are connected by diagonal jointed braces $s$, by which their distance apart is always maintained, while they are allowed to move freely up and down. This is very important, and has not been effected, that I am aware of, in any similar apparatus heretofore made.

Having thus fully described my improvements, what I claim therein as new, and for which I desire to secure Letters Patent, is—

1. The combination of the carrying-wheel $c$ and shaft $e$, substantially as described, by means of the spur-gear and crown-wheel with a lateral motion, by which the quantity of seed sown can be exactly regulated.

2. The adjustable gage for regulating the depth to which the seed shall be sown and for the other purposes named, covering and depressing the earth over the seed, so as to receive moisture, &c.

3. The mode of securing the parallel motion of all the teeth laterally by means of the diagonal braces, all as herein fully set forth.

J. P. ROSS.

Witnesses:
   J. J. GREENOUGH,
   WM. GREENOUGH.